United States Patent [19]

Werner

[11] Patent Number: 4,504,034

[45] Date of Patent: Mar. 12, 1985

[54] DEVICE FOR USE WITH HIGH CURRENT CARRYING ELECTRICAL CABLE

[75] Inventor: Walter M. Werner, Dowingtown, Pa.

[73] Assignee: AMP Incorporated, Harrisburg, Pa.

[21] Appl. No.: 320,152

[22] Filed: Nov. 10, 1981

Related U.S. Application Data

[63] Continuation-in-part of Ser. No. 262,006, May 8, 1981.

[51] Int. Cl.³ .............................................. E21F 17/02
[52] U.S. Cl. ...................................................... 248/63
[58] Field of Search ................. 248/63, 68 R, 64, 65; 403/368, 369, 191, 206, 371, 372; 24/115 M, 136 L

[56] References Cited

U.S. PATENT DOCUMENTS

| | | | |
|---|---|---|---|
| 1,407,477 | 2/1922 | Plimpton | 248/63 |
| 1,706,972 | 3/1929 | Zagorski | 403/371 |
| 1,708,979 | 4/1929 | Usher | 403/369 |
| 1,867,043 | 7/1932 | Wirschitz | 403/369 |
| 2,294,398 | 9/1942 | Fergunson | 403/371 |
| 2,441,304 | 5/1948 | West | 403/368 |
| 2,539,333 | 1/1951 | Silbermann | 403/368 |
| 2,666,605 | 1/1954 | Chisholm | 248/63 |
| 3,215,027 | 11/1965 | Modrey et al. | 403/368 |
| 3,287,040 | 11/1966 | Verticchio | 403/368 |
| 4,407,471 | 10/1983 | Wilmsmann et al. | 248/63 |

FOREIGN PATENT DOCUMENTS

| | | | |
|---|---|---|---|
| 715993 | 12/1931 | France | 403/369 |
| 297159 | 9/1928 | United Kingdom | 63/ |

Primary Examiner—William H. Schultz
Assistant Examiner—Ramon O. Ramirez
Attorney, Agent, or Firm—Allan B. Osborne

[57] ABSTRACT

The present invention relates to devices for use in attaching high current carrying electrical cable to high tension towers and the like. More particularly, the invention includes a body having an opening through which the cable passes and into which a wedge is driven to captivate the cable. The body further includes attachment points for being attached to a high tension tower or utility pole.

4 Claims, 13 Drawing Figures

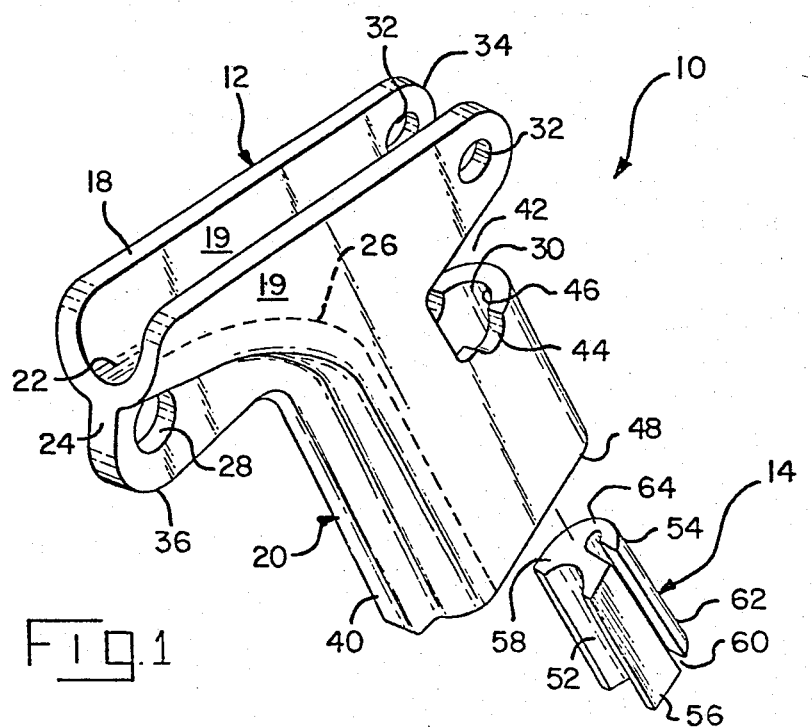
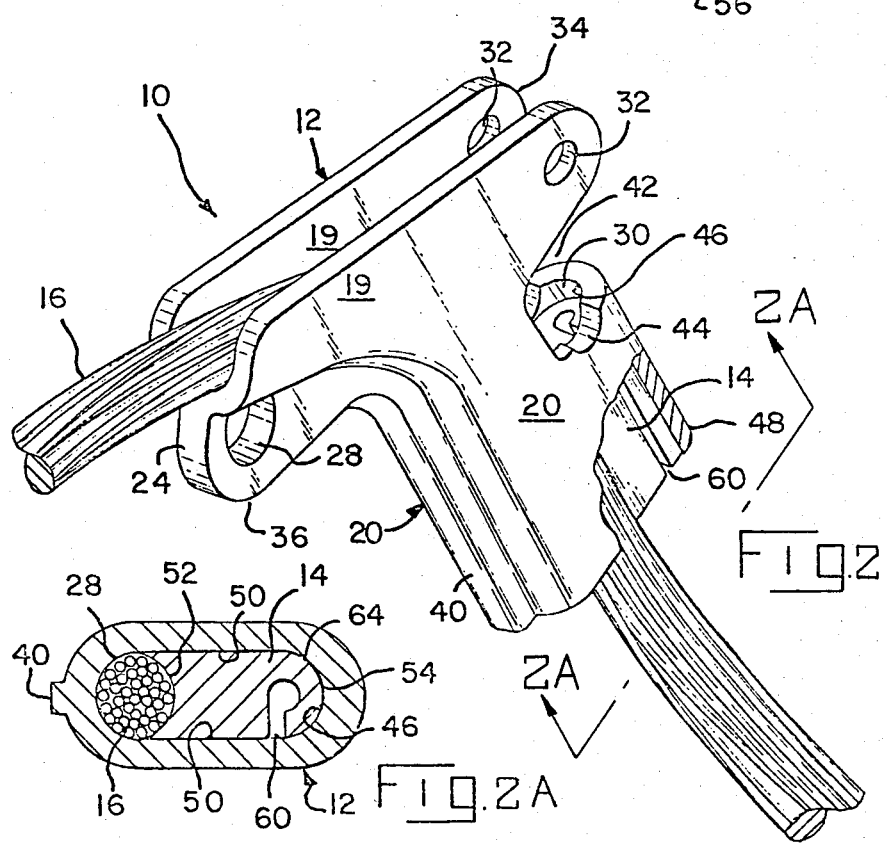

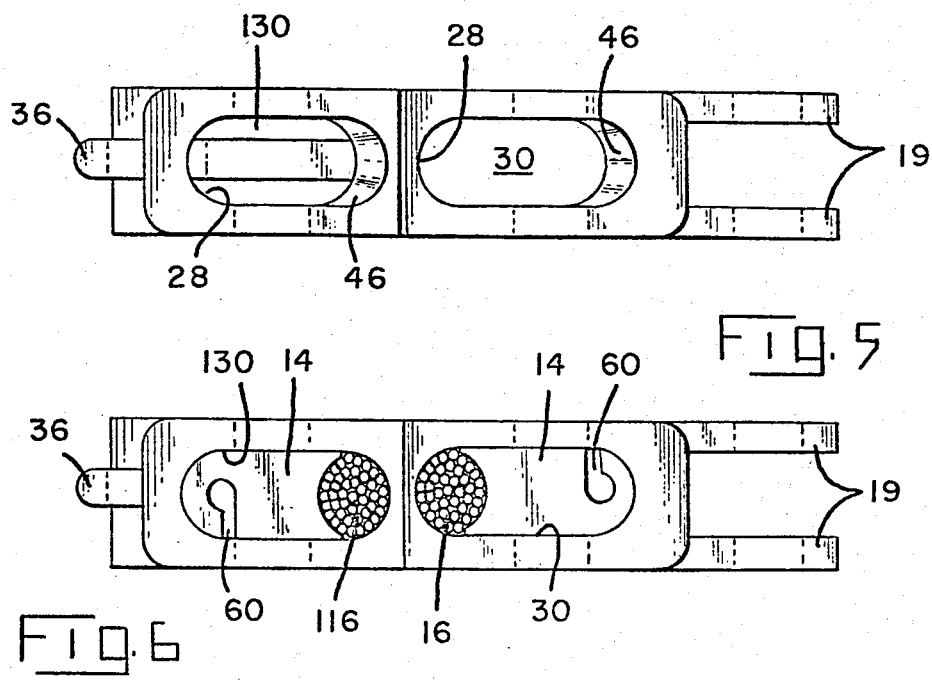
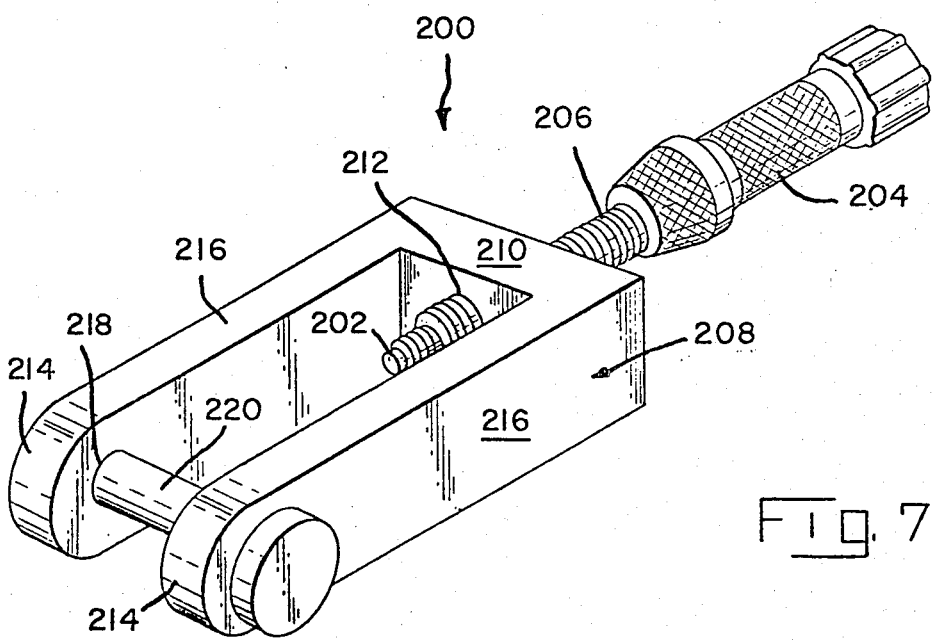

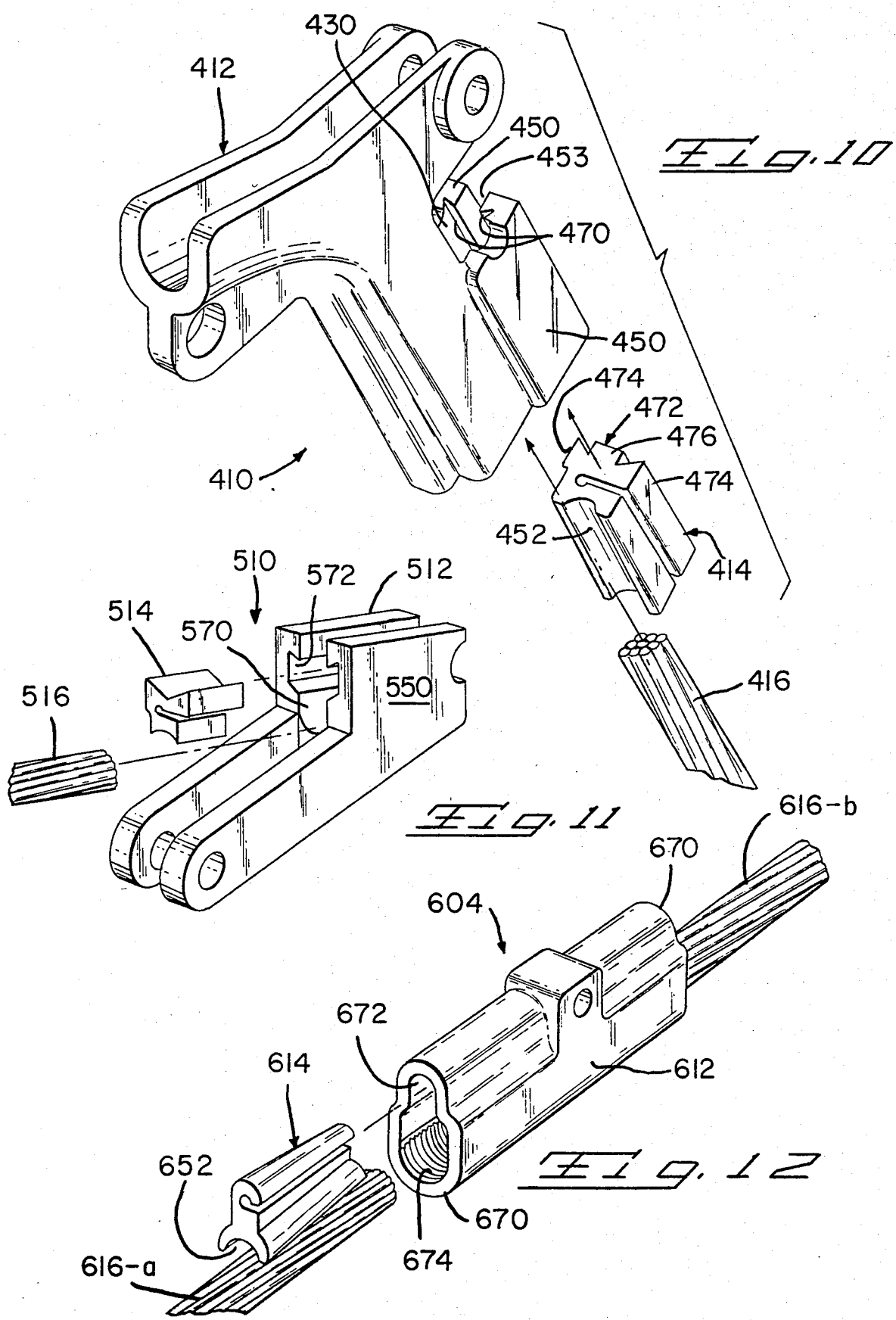

DEVICE FOR USE WITH HIGH CURRENT CARRYING ELECTRICAL CABLE

The present application is a continuation-in-part of application Ser. No. 262,006, filed May 8, 1981.

The invention disclosed herein relates to devices which are attached to an electrical cable and to an insulated line leading from the tower supporting the cable.

Prior art and concurrent devices include two half shells between which the cable is placed and then are bolted together. One half shell includes attachment points for being attached to the line extending from the tower.

The present invention includes a body having a pistol-like shape with a cable receiving opening extending therethrough. Further, the device includes a wedge. The wedge is driven into the opening to captivate a cable positioned therein. Attachment points are provided on the body for attachment to the insulated line connecting the cable to the supporting tower. An alternative embodiment includes a second opening so that two cables can be retained. Further, a tool and attachment for driving the wedges into the opening is disclosed.

FIGS. 1 and 2 are perspective views of one embodiment of the present invention;

FIG. 2-a is a section view taken along lines 2a–2a on FIG. 2;

FIGS. 5 and 6 are views looking into one end of the embodiment of FIGS. 3 and 4 respectively;

FIG. 7 is a perspective view of a tool for use in captivating a cable in the embodiments of the present invention;

Figure 3:
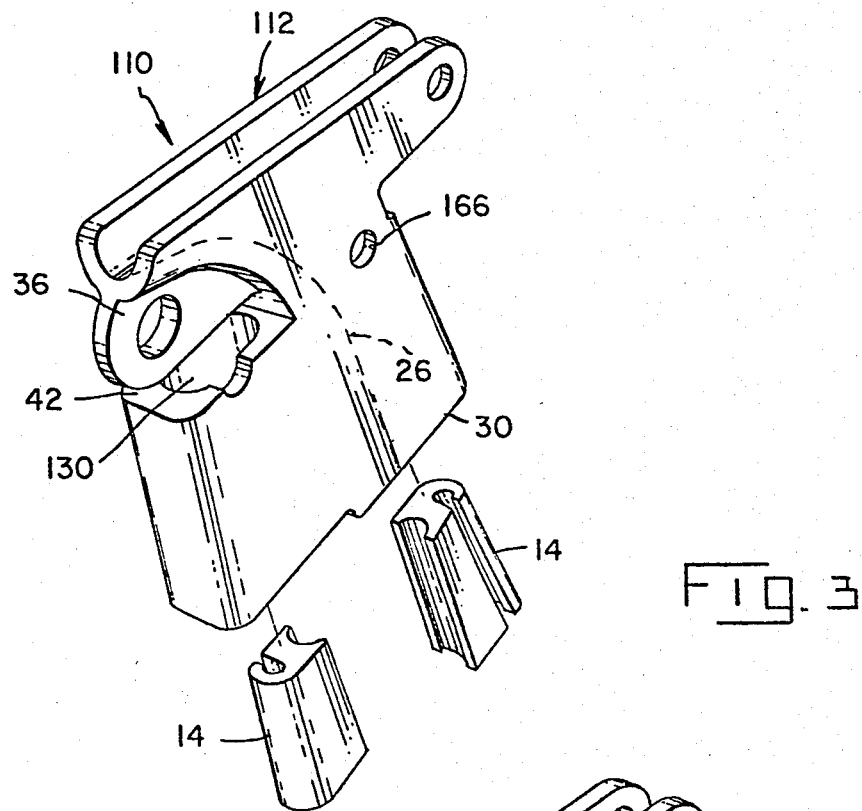
FIGS. 3 and 4 are perspective views of a second embodiment of the present invention.

FIGS. 10, 11, and 12 are perspective views of other embodiments of the present invention.

FIGS. 1 and 2 are views illustrating the device 10 of the present invention. The device consists of body 12 and wedge 14. As shown in FIG. 2 cable 16 is threaded through the body and captivated therein by driving the wedge into the body.

Body 12 is made from aluminum, either A360 or A380 if die casted or As65T-6 if sand-casted. The upper section 18 consists of two parallel side walls 19 which merge laterally and frontally into a depending, hollow vertical section 20. Web 22 joins the side walls at the front 24 of upper section 18 and provides a channel in conjunction with side walls 19 for cable 16. The web surface curves down as indicated by dashed line 26 and becomes an interior front wall 28, one of the four walls defining opening 30 which extends through vertical section 20. FIGS. 2-a and 5 show end wall 28. The upper section is opened rearwardly and downwardly to the rear of web 22. Two holes 32 are located in side walls 19 near the rear 34 of that section. Flange 36 depends from the upper section below front 24. Hole 38 is provided in that flange. The flange continues downwardly on the front 40 of vertical section 20, providing strength and rigidity to that section.

A space 42 is provided at the rear half of vertical section 20 just below side walls 19. This space and the two aligned, arcuate cut-outs 44 cooperate with the tool shown in FIG. 7 to drive wedge 14 into opening 30.

Opening 30 is oval shaped in cross-section and decreases in width; i.e., between front wall 28 and rear wall 46, uniformly from the entrance on the underside 48 of vertical section 20 upwardly to space 42. The decreased width is accomplished by beveling rear wall 46 inwardly as shown in FIG. 5.

The two lateral walls 50 of opening 30 are parallel, one to the other.

Wedge 14 is preferably made from the same material as body 12. This elongated member has a grooved side 52 which conformably engages cable 16. The opposite side 54 is rounded to conformably engage rear wall 46 of opening 30. The wedge further uniformly decreased in width by side 54 converging towards side 52. The convergence is in the direction from trailing end 56 to leading end 58.

Slot 60 runs the length of the wedge and is located adjacent side 54. The slot is a dogleg; i.e., it extends into the wedge and then turns outwardly toward side 54. The effect of this slot is to make that portion of the wedge a hinged spring member, hereinafter indicated by reference numeral 62; that is, this member may be resiliently deformed into the slot with the hinge point being generally indicated by reference numeral 64.

Cable 16 is captivated in device 10 by being wedged between interior wall 28 and grooved side 52 on wedge 14. After the cable is threaded through opening 30, the wedge, with end 58 leading, is driven into the opening from underside 48. As the wedge moves up into the opening, the converging wall 46 forces the wedge tighter and tighter against cable 16. At the point beyond which the cable can no longer be further compressed, spring member 62 is deformed into slot 60. Being resilient, the spring member continually pushes outwardly to return to its non-deformed position. This force works to keep the cable tightly captivated in device 10.

FIG. 2-a is a cross-sectional view, taken along line 2-a—2-a of FIG. 2 to show the relation between body 12, wedge 14, and cable 16.

Figure 4:
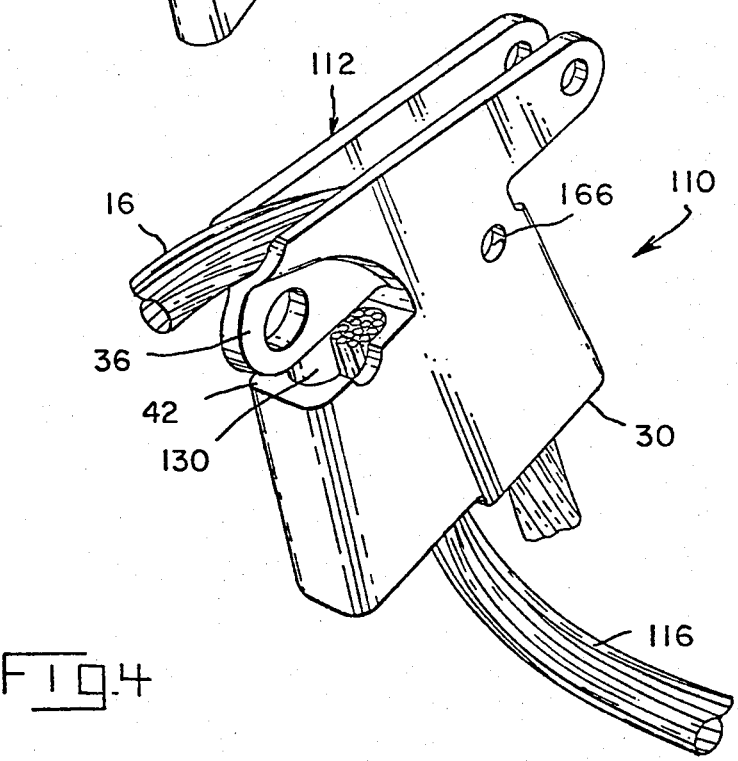

FIGS. 3 and 4 illustrate a second embodiment of the present invention. Device 110 consists of a body 112 and two wedges 14. Body 112 is very similar to body 12, differing primarily in having a second opening 130 in front of opening 30. This opening, in conjunction with the second wedge, captivates a second cable 116 in the same manner as discussed hereinabove. Accordingly, the shape of opening 130 corresponds to shape of opening 30. If cable 116 fails outside the range of cable acceptable in opening 30, then the size of opening 130 and the second wedge would be such as to accommodate that size cable.

Space 42 is associated with opening 130 and with respect to opening 30 in body 112, two, aligned holes 166 (only one can be seen) are provided.

FIGS. 5 and 6 are views looking into the underside 148 of device 110.

FIG. 7 illustrates tool 200 which may be used to drive wedge 14 into openings 30 and 130. The tool includes a powder-driven ram 202 slidably mounted in handle 204. This portion of the tool is disclosed in U.S. Pat. No. 3,296,792. Handle 204 includes a shaft 206 through which the ram slides and is supported. The outer surface of this shaft is threaded so that the handle may be adjustably attached to yoke 208. Bight 210 of the yoke has a threaded hole 212 which receives the shaft. The free ends 214 of yoke arms 216 have aligned holes 218 which receive bolt 220.

Figure 8:
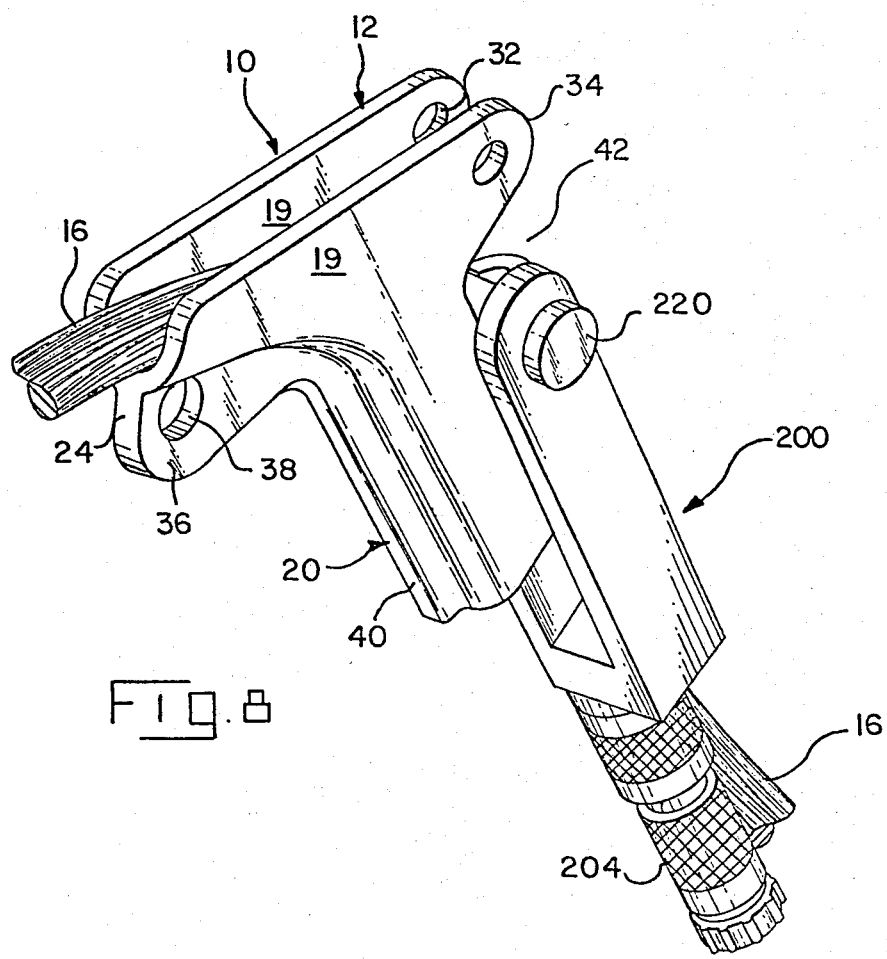
FIG. 8 is a perspective view of the tool of FIG. 7 attached to the embodiment of FIGS. 1 and 2.

FIG. 8 demonstrates the use of tool 200 in driving wedge 14 into opening 30.

The wedge is placed into opening 30 as fast as possible by hand after threading cable 16 therethrough. A powder-filled shell (not shown) is loaded into handle 204 and the tool is placed on device 10 by slipping the bolt 220 into space 42 asnd onto cut-outs 44. Handle 204 is rotated in hole 212 until the tip of ram 202 abuts wedge 14. The shell is fired and the gases generated drive the ram forwardly, pushing the wedge up into opening 30. The tool is removed by removing bolt 220.

Figure 9:
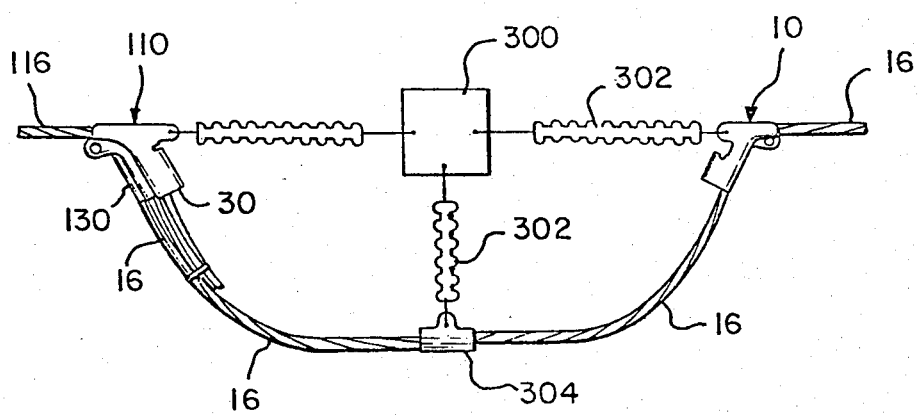
FIG. 9 is a drawing showing the uses of the present invention.

FIG. 9 illustrates the uses of devices 10 and 110. Reference numeral 300 schematically represents a high tension tower or utility pole. Cable 16 on the right is to be electrically linked up with cable 116 on the left with both cables being supported by tower 300. Cable 16 is threaded through device 10 and captivated therein in the manner described above. An insulated line 302 is attached to tower 300 at one end and to device 10 at the other end, using holes 32 as attachment points.

Device 110 capativates cable 116 in opening 30 and the end of cable 16 in opening 130. Device 110 is attached to tower 300 by a second insulated line 302. Cable 16 may be further supported by a third insulated line 302 attached to a cradle 304.

With reference to FIG. 10, device 410 shown therein is another embodiment of the present invention. Except for the wedge-receiving opening 430, body 412 is basically identical to body 12. Opening 430 includes side walls 450 but they are not joined rearwardly.

A beveled notch 470 extends down the inside surface of each side wall adjacent the rearwardly facing free ends thereof.

The other surfaces of opening 430 are the same as for opening 30 in body 12.

Wedge 414 differs from wedge 14 in the structure of the side opposite grooved side 452. Rather than being rounded, that side, indicated by reference numeral 472 is structured to include two rearwardly pointing edges 474 and a squarish bar 476 inbetween extending along the length of the wedge.

Cable 416 is captivated in device 410 by driving wedge 414 into opening 430. The edges 474 are conformably received in notches 470 and bar 476 is received in the opening between the free ends of side walls.

In FIG. 11, device 510 includes body 512 and wedge 514. The body includes a groove 570 in which cable 516 is received. The inside surfaces of side walls 550, extending up from groove 570 are notched as indicated by reference numeral 572.

Wedge 514 is shaped to be received in bewtween the side walls with sides 574 being conformably received in notches 572.

FIG. 12 illustrates a cradle 604. A pair of wedges 614 (only one being shown) are driven into each end 670 of body 612 to captivate cables 616-a and 616-b. The passage 672 extending through body 612 contains a plurality of teeth 674 on the surface against which the cables are pushed by wedges 616. The teeth grip the cables and, in the case of aluminum cables, break through the oxides.

Wedges 614 are very nearly identical to wedges 14 with the differences being in the cross-sectional shape. The cable engaging side 562 flares out to provide a sufficient cable gripping surface. The other portion of the wedge is not unlike wedge 14.

Structures for using tool 200 to drive the wedges are provided on the devices shown in FIGS. 10, 11, and 12.

The present invention may be subject to many modifications and changes without departing from the spirit or essential characteristics thereof. The present embodiment is therefore intended in all respects as being illustrative and not restrictive of the scope of the invention.

I claim:

1. A device for captivating a cable therein, said device comprising:
   a. a body having a vertical section consisting of two side walls and a vertical section with an opening therethrough, said opening being oval shape and decreasing in width from a first end towards a second, said opening being adapted to receive a cable therethrough and a wedge
   b. said wedge having one side grooved to conformably slide along the cable and an opposite side rounded to conformably slide along one side of the opening, said wedge further being slotted adjacent the rounded side to form a resilient spring member and further said rounded side converging inwardly towards the grooved side from one end towards the other end so that as the wedge is driven into the opening with a cable positioned therein, the converging walls of the opening and wedge cooperate to captivate the cable therein, and further causing the spring member to be resiliently deformed so as to exert outward force against the wall of the opening to maintain continued pressure on the cable.

2. The device of claim 1 further including an additional opening and a second wedge whereby two cables may be captivated.

3. The device of claim 2 further including means on the two side walls for attachment to insulated lines from a support tower.

4. A device for captivating a cable therein, said device comprising:
   a. a body having a tapered opening therethrough to receive a cable and a wedge
   b. said wedge being tapered having one side grooved to conformably slide along the cable and a slot extending along the length thereof and positioned between the grooved side and opposite side to define a resilient spring member so that as the wedge is driven into the opening with a cable positioned therein, the walls of the opening and the wedge cooperate to captivate the cable therein and further to resiliently deform the spring member into the slot so as to exert outward force against the wall of the opening to maintain continued pressure on the cable.

* * * * *